(12) United States Patent
Peters

(10) Patent No.: US 9,243,739 B2
(45) Date of Patent: Jan. 26, 2016

(54) SYSTEM AND METHOD FOR MOUNTING A HANDHELD ELECTRONIC DEVICE

(75) Inventor: Christopher Peters, Glen Iris (AU)

(73) Assignee: ANNEX PRODUCTS PTY. LTD., Prahran (AU)

( * ) Notice: Subject to any disclaimer, the term of this patent is extended or adjusted under 35 U.S.C. 154(b) by 231 days.

(21) Appl. No.: 13/483,549

(22) Filed: May 30, 2012

(65) Prior Publication Data

US 2013/0318775 A1 Dec. 5, 2013

(51) Int. Cl.
| | |
|---|---|
| A47B 96/00 | (2006.01) |
| A47K 1/00 | (2006.01) |
| A47K 5/00 | (2006.01) |
| E04G 5/06 | (2006.01) |
| F16L 3/08 | (2006.01) |
| F21V 21/00 | (2006.01) |
| F21V 35/00 | (2006.01) |
| F16M 13/00 | (2006.01) |
| A45F 5/00 | (2006.01) |
| F16M 13/02 | (2006.01) |
| A47G 29/00 | (2006.01) |
| F16M 11/00 | (2006.01) |
| A47F 5/00 | (2006.01) |
| A47F 7/00 | (2006.01) |
| A45C 11/00 | (2006.01) |
| B65D 5/52 | (2006.01) |
| B65D 25/24 | (2006.01) |

(Continued)

(52) U.S. Cl.
CPC .................. *F16M 13/00* (2013.01); *A45F 5/00* (2013.01); *F16M 13/02* (2013.01); *A45C 2011/001* (2013.01); *A45C 2011/002* (2013.01); *A45C 2011/003* (2013.01); *F16M 2200/02* (2013.01); *Y10T 29/49002* (2015.01); *Y10T 29/5313* (2015.01)

(58) Field of Classification Search
CPC . A45F 5/00; A45F 2005/025; A45F 2200/00; A45F 2200/005; A45F 2200/05; A45F 2200/0508; A45F 2200/0516; A45F 2200/0525; A45C 2011/001; A45C 2011/002; A45C 2011/003; H04B 1/3888
USPC ......... 248/902, 905, 309.1, 310, 314, 220.22, 248/221.11, 222.52, 224.8; 206/412, 701; 224/197, 412, 419, 929
See application file for complete search history.

(56) References Cited

U.S. PATENT DOCUMENTS 2,385,180 A * 9/1945 Allen .............................. 411/551
3,171,182 A * 3/1965 Danehy ......................... 411/552

(Continued)

FOREIGN PATENT DOCUMENTS

| EP | 001191266-0002 | 1/2010 |
| EP | 001191266-0003 | 1/2010 |

OTHER PUBLICATIONS

IBike, iBike Sports Products/iPhone Bike Mount, Aug. 10, 2012, http://ibikesports.com/iPhone_bike_mount.html.

(Continued)

*Primary Examiner* — Syed A Islam
*Assistant Examiner* — Taylor Morris
(74) *Attorney, Agent, or Firm* — Barnes & Thornburg LLP

(57) ABSTRACT

A system for mounting an electronic handheld device includes a case having a mounting structure and a locking structure attached to the case by aligning a portion of the locking structure with a portion of the mounting structure and rotating the locking structure or the case.

20 Claims, 13 Drawing Sheets

(51) Int. Cl.

| | |
|---|---|
| B65D 85/00 | (2006.01) |
| A01K 97/04 | (2006.01) |
| A01K 97/06 | (2006.01) |
| B65D 25/52 | (2006.01) |
| B62J 7/00 | (2006.01) |
| B62J 9/00 | (2006.01) |
| B62J 11/00 | (2006.01) |

(56) References Cited

U.S. PATENT DOCUMENTS

| | | | | |
|---|---|---|---|---|
| 5,545,167 | A * | 8/1996 | Lin | 606/278 |
| 6,305,588 | B1 * | 10/2001 | Michel et al. | 224/271 |
| 6,752,299 | B2 | 6/2004 | Shetler et al. | |
| 7,093,742 | B2 * | 8/2006 | Steven et al. | 224/197 |
| 7,354,304 | B2 * | 4/2008 | Livingston | 439/501 |
| 8,078,240 | B2 | 12/2011 | Chang | |
| 8,662,362 | B1 | 3/2014 | Bastian et al. | |
| 8,830,663 | B2 | 9/2014 | Child et al. | |
| 2008/0035690 | A1 * | 2/2008 | Hsai | 224/425 |
| 2008/0232089 | A1 | 9/2008 | Riccardi | |
| 2011/0027048 | A1 * | 2/2011 | Shue | 411/553 |
| 2011/0136555 | A1 | 6/2011 | Ramies et al. | |
| 2013/0181584 | A1 | 7/2013 | Whitten et al. | |

OTHER PUBLICATIONS

Garmin Ltd., Bike Computer, Aug. 10, 2012, https://buy.garmin.com/shop/shop.do?cID=160&ra=true.
Mobility Holdings, Ltd., BioLogic Bicycle Accessories and Bike Gear Gear to Get You There, Aug. 10, 2012, http://www.thinkbiologic.com.
Topeak Inc., Topeak Cycling Accessories-Products-Ride Case, Aug. 10, 2012, http://www.topeak.com/products/ Bags/ridecase/.
Wallee, iPad Wall Mount + iPad Accessories—The Wallee, Aug. 10, 2012, http://www.thewallee.com/.
Bicio, Bicio-GoRide iPhone Bike Mount for fo, Aug. 10, 2012, http://bicio.com/GoRide_iphoneBikeMOunt.php.
Wahoofitness, ANT +iPhone Bike Mount, ANT + Cycling Speed and Cadence Sensor . . . , Aug. 10, 2012, http://www.wahoofitness.com/Products/Wahoo-Fitness-Wahoo-Bike-Pack-for-iPhone.asp.
Cloningeron "The Wallee Wall Mount + Hard Case System for iPad," The Gadgeteer, Jul. 29, 2010 at http://the gadgeteer.com/2010/07/29/the-wallee-wall-mount-hard-case-system-for-ipad/, printed Mar. 3, 2015 (6 pages).

* cited by examiner

SYSTEM AND METHOD FOR MOUNTING A HANDHELD ELECTRONIC DEVICE

CROSS REFERENCE TO RELATED APPLICATIONS

Not applicable.

REFERENCE REGARDING FEDERALLY SPONSORED RESEARCH OR DEVELOPMENT

Not applicable

SEQUENTIAL LISTING

Not applicable

BACKGROUND OF THE INVENTION

1. Field of the Invention

The present invention relates generally to handheld electronic devices, and more particular to apparatuses and methods for attaching a case for a handheld electronic device to one or more objects.

2. Description of the Background of the Invention

A number of apparatuses have been developed and sold to aid in protecting and/or holding handheld electronic devices. For example, different types of cases are sold that enclose and protect a rear and sides of a handheld electronic device. Some cases are made of rigid plastic and may be snapped onto a handheld electronic device. Other cases are made of a flexible material that can be manipulated to attach to and protect a handheld electronic device.

One apparatus for holding a handheld electronic device in, for example, a car or other vehicle, includes a thin layer of rubber, plastic, or other flexible material. A first surface of the layer is coated with a sticky or tacky material such that the first surface may be attached to a dashboard or other surface. A second surface of the layer is also coated with a sticky or tacky material such that, when the first surface is attached to a non-horizontal surface, a handheld electronic device may be attached to and supported on the second surface.

As the number of handheld electronic devices has increased, so has the desire to carry handheld electronic devices at all time. Consumers are always looking for new apparatuses and gadgets with which to use their handheld electronic devices and which allow versatile use of their handheld electronic devices. As long as handheld electronic devices remain a staple, there will always be a need for new apparatuses and gadgets for using such handheld electronic devices.

SUMMARY

According to one aspect of the present invention, a system for mounting an electronic handheld device comprises a case adapted for attachment to an electronic handheld device and a mounting structure within a wall of the case. The mounting structure includes a cavity formed at a first end by an end wall and at a second end by at least two arcuate projections with at least two grooves formed between the at least two projections. The system further includes a locking structure having a generally circular wall with at least two arcuate projections extending outwardly from an edge of the cylindrical wall, wherein at least two grooves are formed between the at least two projections. The looking structure is attached to the case by aligning the at least two arcuate projections of the locking structure with the at least two grooves of the mounting structure and rotating the locking structure or the case until the at least two arcuate projections of the mounting structure are at least partially aligned with the at least two projections of the locking structure, respectively, thereby attaching the case and the locking structure.

In a different aspect of the present inventions a method of mounting an electronic handheld device comprises the step of providing a case having a first wall and one or more side walls forming a body adapted for attachment to an electronic handheld device and a mounting structure within the first wall. The mounting structure includes at least two arcuate projections and at least two grooves formed between the at least two projections. The method further includes the step of providing a locking structure having a generally circular wall with at least two arcuate projections extending outwardly from an edge of the circular wall, wherein at least two grooves are formed between the at least two projections. Still further, the method includes the steps of inserting the at least two arcuate projections of the locking structure into the at least two grooves of the mounting structure and rotating the locking structure or the case until the at least two arcuate projections of the mounting structure are at least partially aligned with the at least two projections of the locking structure, respectively, thereby attaching the case and the locking structure.

In a farther aspect of the present invention, a system for mounting an electronic handheld device comprises a first generally circular wall having at least two arcuate projections extending from an edge of the first circular wall and a second wall spaced from the first wall by one or more supports. Each of the at least two arcuate projections includes a first surface facing away from the second wall and a second surface facing the second wall and each of the at least two arcuate projections further includes a radial elongate projection extending along the second surface of the at least two arcuate projections.

In yet another aspect of the present invention, a system for mounting an electronic handheld device comprises a mount adapted to be attached to a tubular structure, the mount including a mount wall having a first surface with a guide extending therefrom and a second opposing surface adapted to be attached to a tubular structure. The system further includes a cap attached to an end of the guide-opposite the first surface and a locking collar spring-loadingly mounted over the guide. The locking collar is biased against the cap in an unactuated position and the locking collar is actuated by moving the locking collar toward the mount wall.

BRIEF DESCRIPTION OF THE DRAWINGS

Other aspects and advantages of the present invention will become apparent upon consideration of the following detailed description, wherein similar structures have like or similar reference numerals.

DETAILED DESCRIPTION

The present invention is directed to apparatuses for attaching a handheld electronic device to an object or surface. While the present invention may be embodied in many different forms, several specific embodiments are discussed herein with the understanding that the present invention is to be considered only as an exemplification of the principles of the invention, and it is not intended to limit the invention to the embodiments illustrated.

Figure 1:
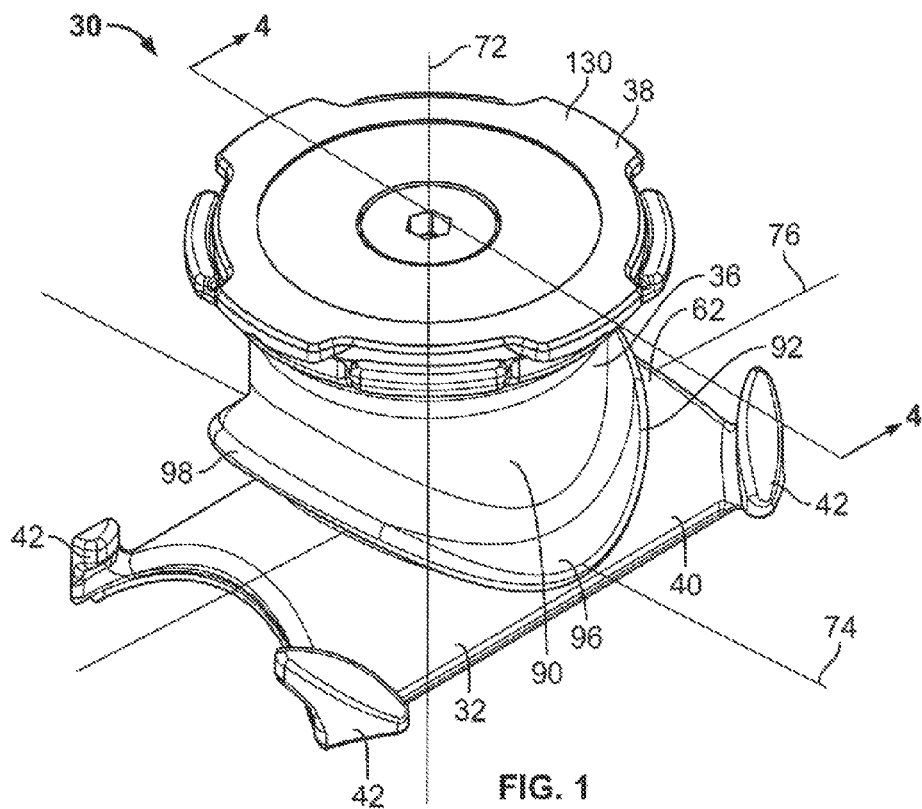
FIG. 1 is a top isometric view of a first embodiment of an apparatus for attaching a handheld electronic device to an object or surface, the apparatus generally including a mounting mechanism for attachment to a tubular structure, a locking collar attached to the mounting mechanism, and a cap attached to the mounting mechanism and cooperating with the looking collar.
Figure 2:
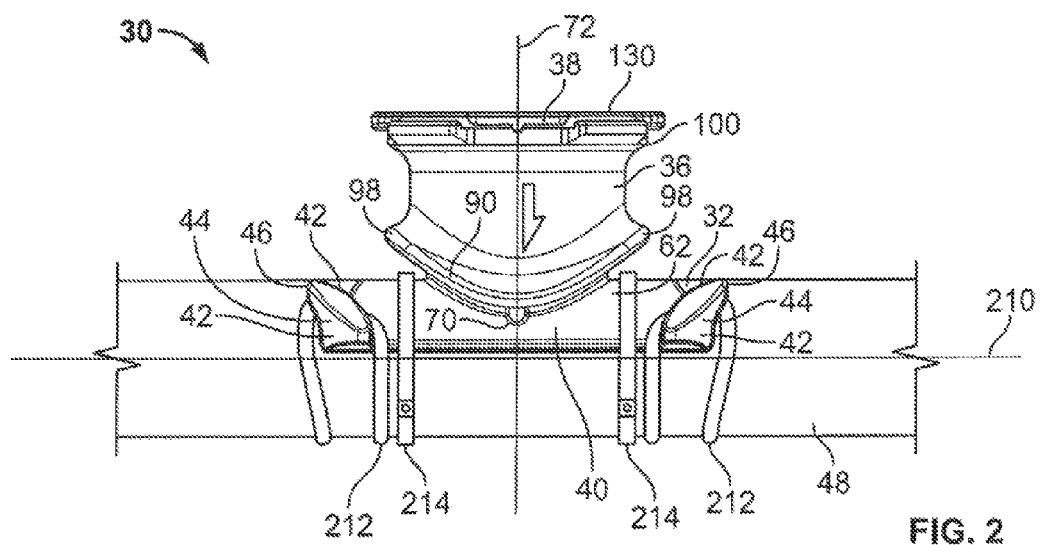
FIG. 2 is a side elevational view of the apparatus of FIG. 1.
Figure 3:
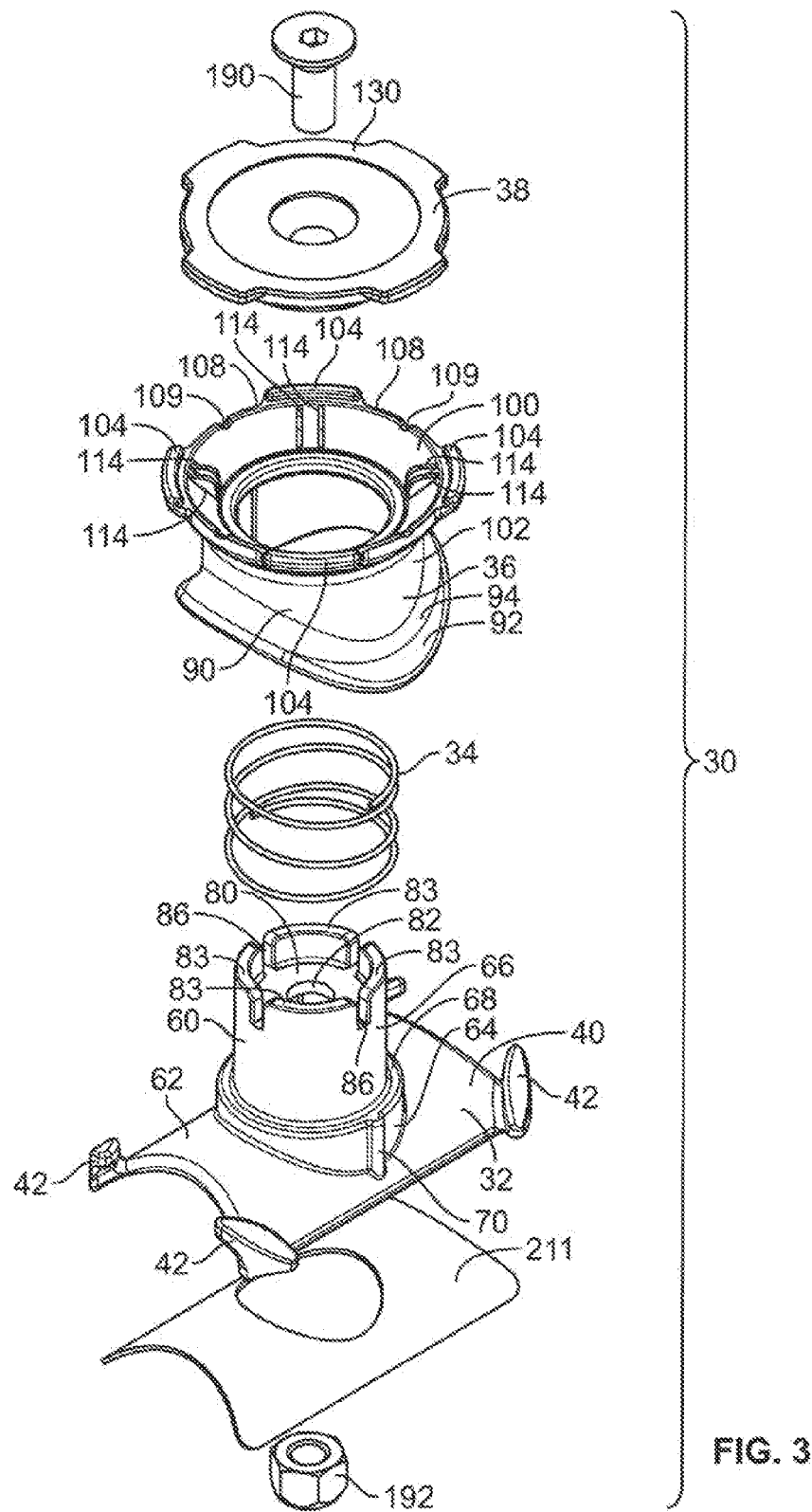
FIG. 3 is an exploded view of the apparatus of FIG. 1.

Referring to the drawings, FIGS. 1-3 depict a first embodiment of an apparatus for attaching a handheld electronic device to an object in the form of a tube mount locking system 30. The tube mount locking system 30 generally includes a mounting mechanism 32, a spring 34, a locking collar 36, and a cap 38.

Referring to FIGS. 3 and 6-8, the mounting mechanism 32 includes a curved mounting plate 40 having a plurality of retaining mechanisms 42 extending from corners 44 of the mounting plate 40. Each of the retaining mechanisms 42 includes an upwardly extending wall 44 with an inwardly extending projection 46, the function of which will be discussed in greater detail below. The mounting plate 40 has a curved shape that generally conforms to a tubular-shaped item 48, such as a tubular bar of a bicycle or other similar structure. A lower surface 50 of the mounting plate 40 is adapted for attachment to the tubular-shaped item 48, as will be discussed below.

A cylindrical mourning structure 60 extends outwardly from an upper surface 62 of the mounting plate 40. The mounting structure 60 includes a lower wall 64 and an upper wall 66 extending outwardly from the lower wall 64. The lower wall 64 has a diameter that is greater than a diameter of the upper wall 66, thereby forming a planar ledge 68 between the walls 64, 66. Two opposing elongate-vertical projections 70 extend outwardly from the lower wall 64 and are generally parallel to a vertical axis 72 (FIG. 7) of the mounting structure 60. The projections 70 are disposed 180 degrees from one another and are generally aligned with a lateral axis 74 (FIG. 6) of the mounting plate 40, wherein the lateral axis 74 is transverse to a longitudinal axis 76 (FIG. 6) of the mounting plate 40. While two projections 70 are depicted, one or more projections 70 may be utilized.

The upper wall 66 of the cylindrical mounting structure 60 includes a top wall 80 with an aperture 82 therethrough. Four annular walls 83 extend outwardly from an edge 84 of the upper wall 66 to form notches 86 between each of the annular walls 83.

Referring to FIGS. 3 and 9-12, the locking collar 36 includes a central cylindrical wall 90, with a skirt 92 extending downwardly front a first end 94 of the cylindrical wall 90. The skirt 92 includes alternating downwardly extending portions 96 and upwardly extending portions 98 that form a generally curved shape adjacent the upwardly extending portions that conforms to the curved shape of the mounting plate 40.

The locking collar 36 further includes a frustroconical wall 100 extending outwardly from a second end 102 of the cylindrical wall 90. The frustroconical wall 100 includes four annular projections 104 extending outwardly front an edge 106 of the frustroconical wall 100 with grooves 108 formed between the annular projections 104. Each of the grooves 108 includes a notch 109 in a center of the groove 108, the function of which will be described below. Center points 110 of the projections 104 are disposed at about 45 degrees with respect to longitudinal and lateral axes 111, 112 (FIGS. 9 and 12) of the locking collar 36 and at 90 degrees with respect to adjacent projections 104. Sets of triangular projections 114 extend outwardly from the fustroconical wall 100 to form grooves 116 therebetween.

Figure 11:
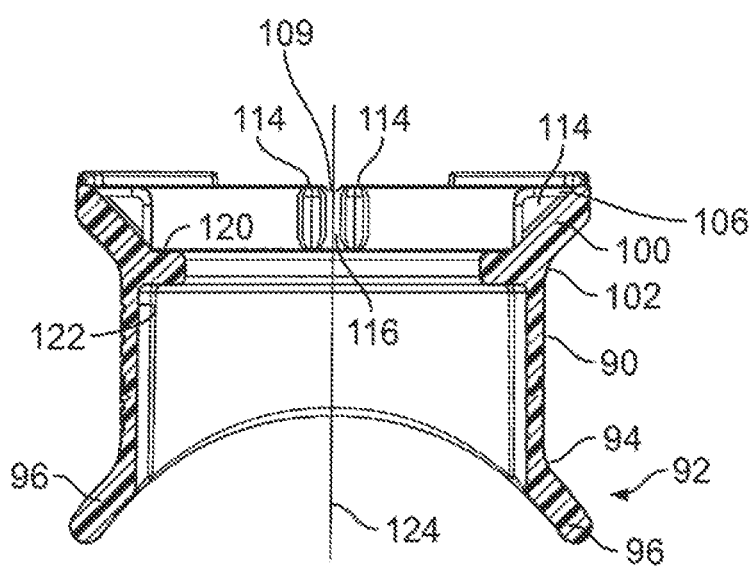
FIG. 11 is a cross-sectional view taken generally along the lines 11-11 of FIG. 9.
Figure 12:
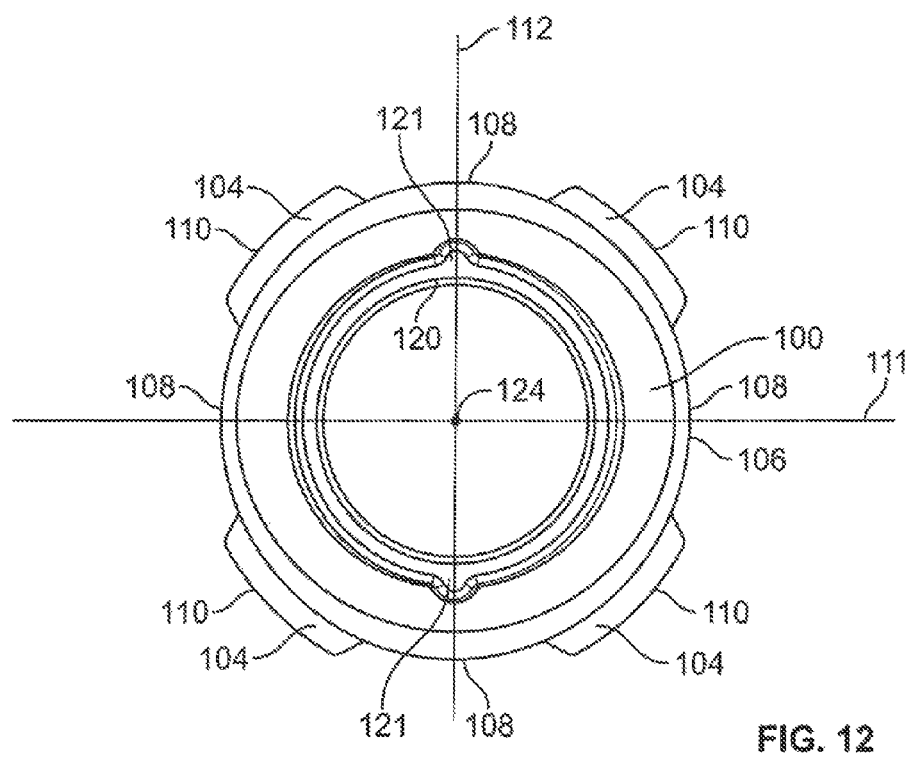
FIG. 12 is a bottom plan view of the locking collar of FIG. 9.

As best seen in FIG. 11, an annular ledge 120 extends inwardly at the second end 102 of the cylindrical wall 90 between the cylindrical wall 90 and the frustroconical wall 100. In addition, grooves 121 are formed within an internal surface 122 of the locking collar 36, as seen in FIG. 12. The grooves 121 are parallel to a vertical axis 124 (FIGS. 11 and 12) of the locking collar 36 and aligned with the lateral axis 112 of the collar 36.

Figure 13:
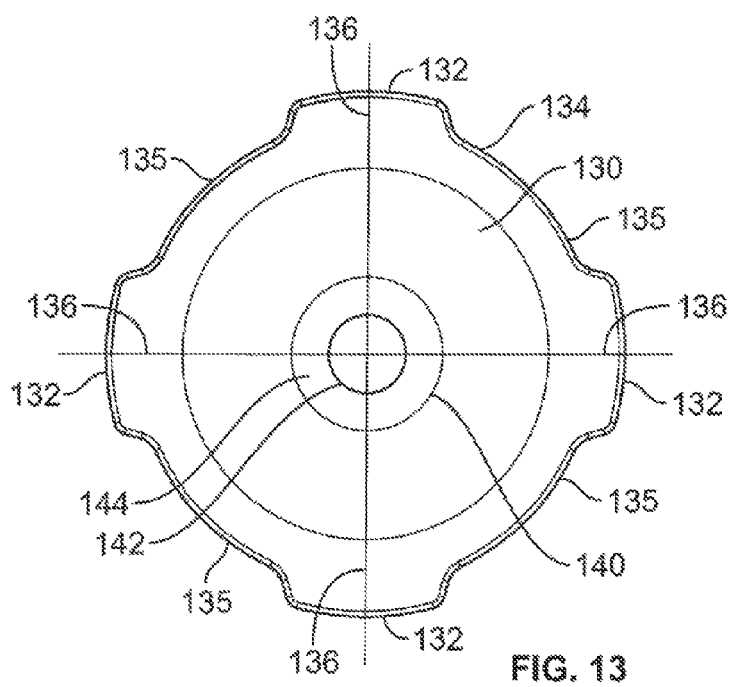
FIG. 13 is a top plan view of the cap generally depicted in FIG. 1.
Figure 14:
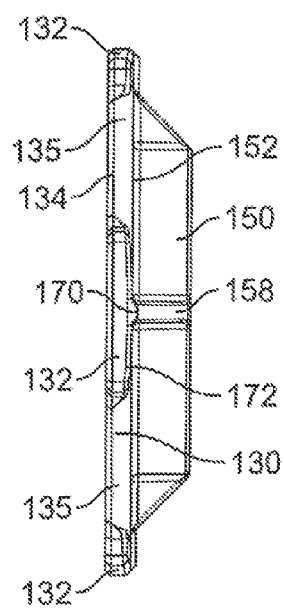
FIG. 14 is a side elevational view of the cap of FIG. 13.

Referring to FIGS. 3 and 13-16, the cap 38 includes a planar circular top wall 130 with four arcuate projections 132 extending outwardly from an edge 134 of the top wall 130, wherein grooves 135 are formed between the arcuate projections 132. Center lines 136 of each of the arcuate projections 132 are disposed at 90 degrees with respect to an adjacent arcuate projection 132, as seen in FIG. 13. A circular central section 140 of the top wall 130 includes an angled wall 144 that tapers inwardly and downwardly leading to a circular aperture 142. The angled wall 144 generally forms a shape in which a head of a screw or other fastener may be seated.

Figure 16:
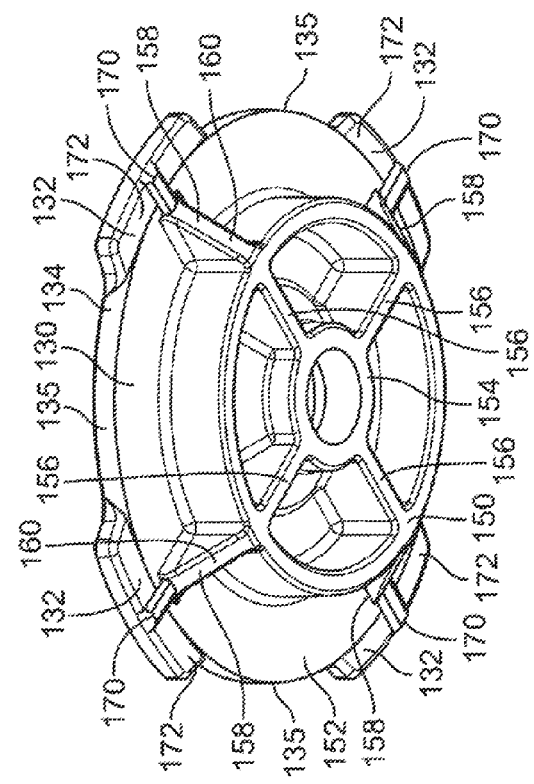
FIG. 16 is a bottom isometric view of the cap of FIG. 13.
Figure 15:
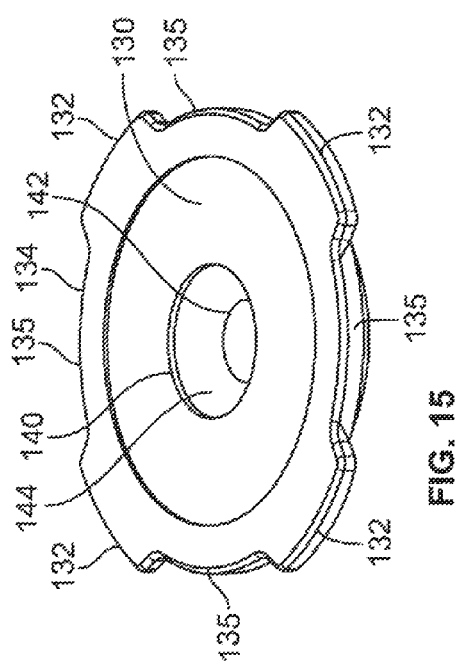
FIG. 15 is a top isometric view of the cap of FIG. 13.
Figure 17:
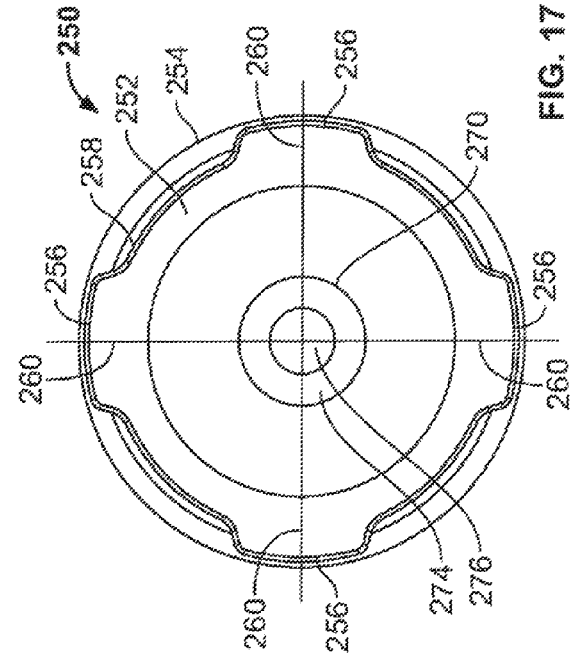
FIG. 17 is a top plan view of a second embodiment of an apparatus for attaching a handheld electronic device to an object or surface.

The cap 38 former includes a first cylindrical wall 150 extending from a bottom surface 152 of the cap 38 and spaced inwardly from the edge 134 of the cap 38. A second cylindrical wall 154 further extends from the bottom surface 152 and is spaced inwardly from the first cylindrical wall 150 and spaced outwardly from the circular aperture 142. As seen in FIG. 16, radial support walls 156 extend between the first and second cylindrical walls 150, 154 and are spaced 90 degrees from one another and generally aligned with the center lines 136 of the arcuate projections 132. Triangular walls 158 having an outer slanted surface 160 extend between the first cylindrical wall 150 and the edge 134 of the cap 38, wherein the triangular walls 158 are aligned with the radial support walls 132 and the center lines 136 of the arcuate projections 132.

As farther seen in FIG. 16, radial elongate projections 170 extend downwardly from bottom surfaces 172 of each of the arcuate projections 132, wherein the radial projections 170 extend along the center lines 136 of the arcuate projections 132 and are aligned with the radial support walls 132 and the triangular support walls 158.

The tube mount locking system 30 is assembled, as seen in FIG. 3, by inserting the spring 34 over the upper wall 66 of the cylindrical mounting structure 60. The spring 34 has a diameter that is greater than a diameter of the upper wall 66, but smaller than a diameter of the lower wall 64 such that the spring 34 rests on the planar ledge 68 formed between the lower and upper walls 64, 66 with the spring 34 spaced from or in contact with an outer surface 180 of the upper wall 66.

The locking collar 36 is thereafter mounted over the cylindrical mounting structure 60 by aligning the two opposing elongate vertical projects 70 of the cylindrical mounting structure 60 within the grooves 121 formed in the internal surface 122 of the locking collar 36. In this position, the upwardly extending portions 98 of the skirt 92 of the locking collar 36 are spaced from a central section 182 of the curved mounting plate 40 and the downwardly extending portions 96 are spaced from downwardly extending ends 184 of the curved mounting plate 40.

Once the cylindrical mounting structure 60, the spring 34, and the locking collar 36 are assembled, the cap 38 is positioned atop the mounting collar 36 with the radial support walls 156 of the cap 38 extending through the notches 86 formed by the annular walls 83 of the mounting structure 60. This allows alignment of the cap 38 with each of the arcuate projections 132 within the grooves 105 of the locking collar 36. In this manner, the projections 170 extending from the bottom surfaces 172 of the arcuate projections 132 reside within the notches 109. In addition, the triangular walls 158 extending from the bottom surface 152 of the cap 38, are located within the grooves 116 formed by the triangular projections 114 of the locking collar 36.

A screw 190 or other fastener is inserted into the aperture 142 in the cap 38 such that a generally frustroconical head of the screw 142 is seated against the angled wall 144 and a central portion of the screw 142 extends through the aperture 82 in the top wall 80 of the cylindrical mounting structure 60. A nut 192 is fastened onto the screw 190 until an upper surface of the nut 192 is adjacent a lower surface of the top wall 80, thereby securing the components of the tube mount locking system 30 together.

After assembly, the tube mount locking system 30 may be attached to a tubular-shaped item 48. Specifically, the curved mounting plate 40 is positioned over the tubular-shaped item 48 with the longitudinal axis 76 of the mounting plate 40 parallel to a longitudinal axis 210 (see FIG. 2) of the tubular-shaped item 48. A rubber spacer 211 may be disposed between the mounting plate 40 and the tubular-shaped item 48 to prevent movement of the tube mount locking system 30 and prevent damage to the tubular-shaped item 48. As seen in FIG. 2, two o-rings 212 may be used to attach the mounting plate 40 to the tubular-shaped item 48. A looped end of each of the o-rings 212 is hooked on the inwardly extending projection 46 of a first of the retaining mechanisms 42, then the o-ring is wound around the tubular-shaped item 48 and an opposing looped end of the o-ring 212 is attached to the inwardly extending projection 46 of a second of the retaining mechanisms 42. Each of the endings 212 may be attached to retaining mechanisms 42 that are aligned along the lateral axis 74 of the mounting plate 40. Optionally, a single o-ring 212 may be utilized and attached to each of the retaining mechanisms 42 or any number of o-rings 212 may be attached to any number of retaining mechanisms 42 and/or any of the retaining mechanisms 42. Cable ties 214 may additionally or alternative be utilized to attach the time mount locking system 30 to the tubular-shaped item 48. If utilized, the cable ties 214 may be wound around the tubular-shaped item 48 and the mounting plate 40 between the cylindrical mounting structure 60 and each set of the retaining mechanisms 42, as depicted in FIG. 2.

Figure 19:
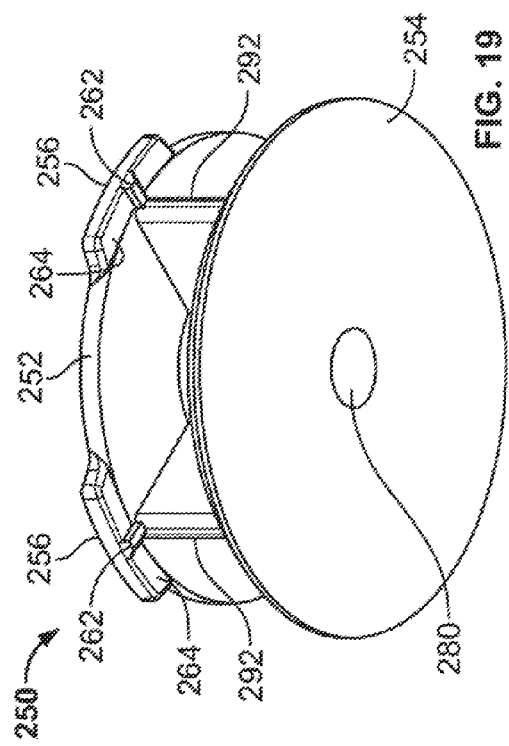
FIG. 19 is a bottom isometric view of the apparatus of FIG. 17.

A second embodiment of an apparatus for attaching a handheld electronic device to an object in the form of a lock mount 250 is depicted in FIGS. 17-20. The lock mount 250 includes first and second spaced plates 252, 254. The first plate 252 is generally cylindrical with four arcuate projections 256 extending from an edge 258 of die first plate 252 with grooves 259 formed between the arcuate projections 256. Center lines 260 of each of the arcuate projections 256 are disposed at 90 degrees with respect to adjacent arcuate projections 256. As depicted in FIG. 19, radial elongate projections 262 extend outwardly from rear surfaces 264 of each of the arcuate projections 256, wherein, the radial projections 262 extend along the center lines 260 of the arcuate projections 132.

A circular central section 270 of the first plate 252 includes an angled wall 272 that tapers inwardly and downwardly leading to a first circular aperture 274. The angled wall 272 generally forms a shape in which a head of a screw or other fastener may be seated. Referring to FIG. 19, a second circular aperture 280 extends through the second plate 254 and is aligned along a vertical axis 282 of the lock mount 250 with the first aperture 274.

Figure 20:
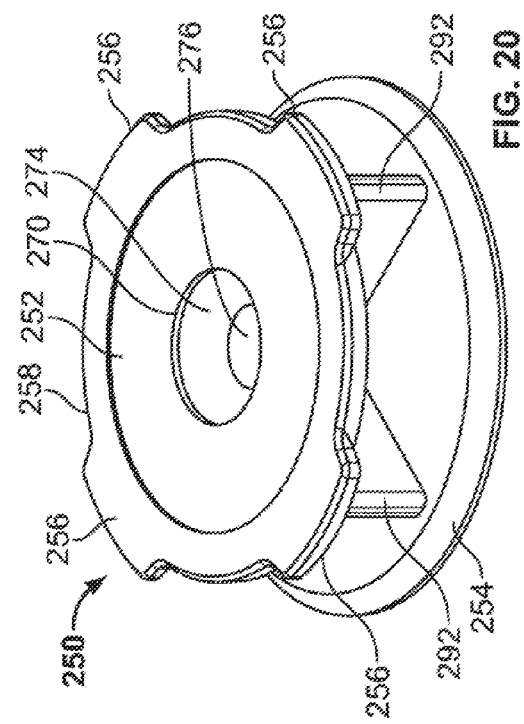
FIG. 20 is a top isometric view of the apparatus of FIG. 17.
Figure 18:
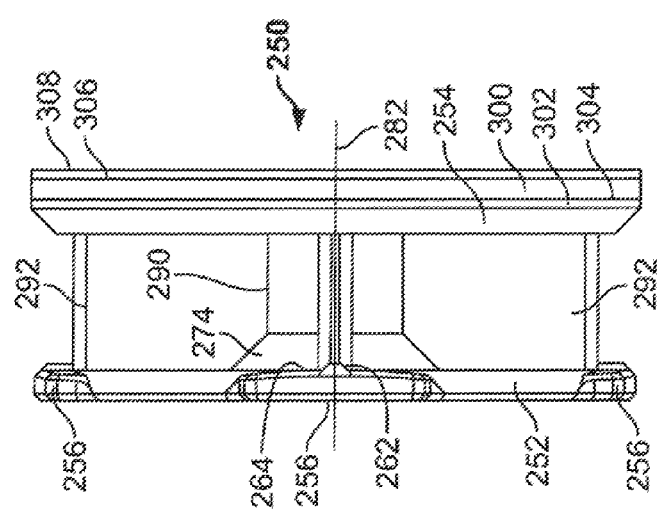
FIG. 18 is a side elevational view of the apparatus of FIG. 17.

As best seen in FIGS. 18-20, the lock mount 250 further includes a cylindrical wall 290 extending between the first and second plates 252, 254 and surrounding the first and second apertures 274, 280. Four radial walls 292 extend outwardly from the cylindrical wall 290 to the edge 258 of the first plate 252. The radial walls 292 extend between the first and second plates 252, 254 and are generally aligned with the radial elongate projections 262. The number, and orientation of the walls 292 may be modified, so long as the first and second plates 252, 254 are spaced apart enough to allow attachment of a device to the first plate 252, as will be discussed in greater detail below.

The lock mount 250 may be attached to a vertical horizontal, or angled surface or structure in a number of different manners. For example, and referring to FIG. 18, the lock mount 250 may be provided with a double-sided adhesive structure 300 attached to an outer surface 302 of the second plate 254. A first side 304 of the adhesive structure 300 may be adhesively attached to the outer surface 302 and a second side 306 may include an adhesive with a removable sheet 308. Once the removable sheet 308 is detached from the outer surface 302, the adhesive structure 300 may be attached to the surface or structure. Optionally, a screw, bolt, or other fastener may be inserted through the first and second apertures 274, 280 (possibly with a head of the fastener seated against the angled wall 272) and secured to a surface or structure.

A cover 350, which may be attached in a typical manner to a handheld electronic device, is depicted in FIGS. 21-24. The cover 350 may be utilized in combination with the tube mount locking system 30 or the lock mount 250, as described in greater detail below. The cover includes a first wall 352 for covering, for example, a rear surface of the handheld electronic device. A plurality of side walls 354 extend outwardly from an edge 356 of die first wall 352, and are adapted to cover, for example, sides of the electronic handheld device. The side walls 354 may include any number of apertures 355 for accessing components of the handheld electronic device. While one embodiment of a cover 350 is depicted and described herein, any size or shape cover may be utilized without departing from the scope of the present invention.

Figure 21:
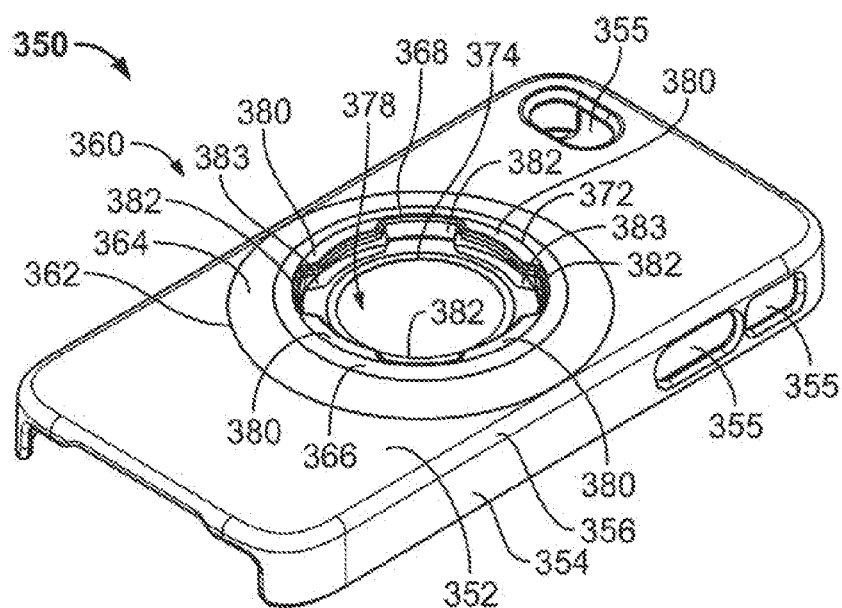
FIG. 21 is a top isometric view of a case for a handheld electronic device and for use with the apparatuses of FIG. 1 and FIG. 17.
Figure 22:
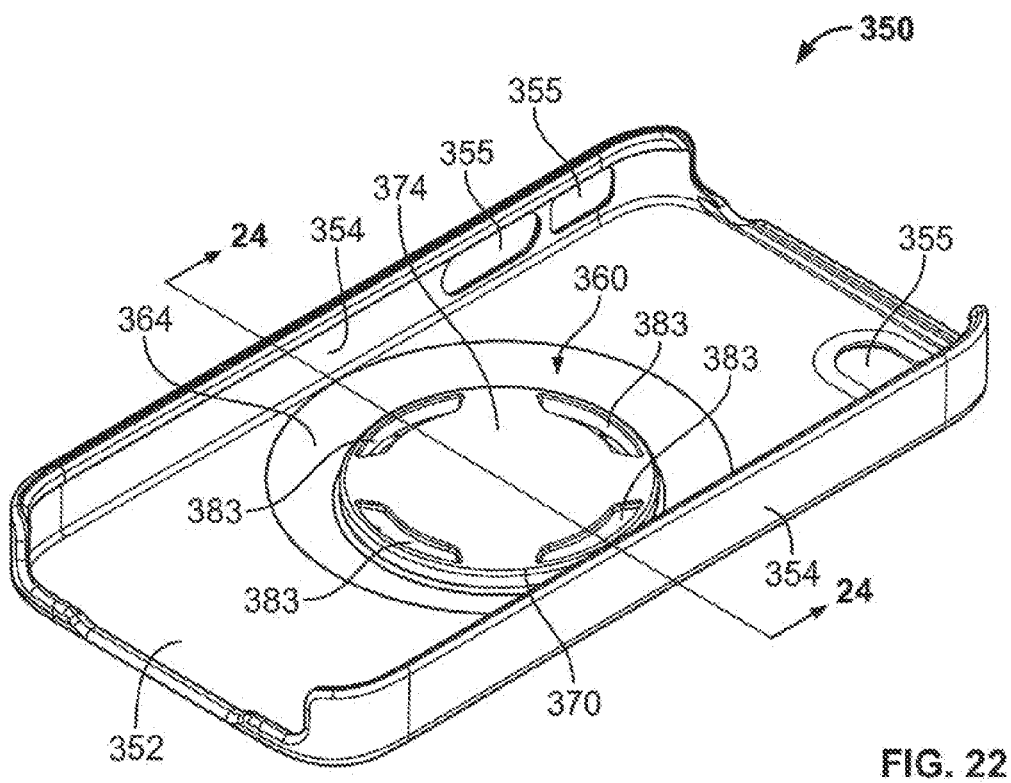
FIG. 22 is a bottom isometric view of the case of FIG. 21.
Figure 24:
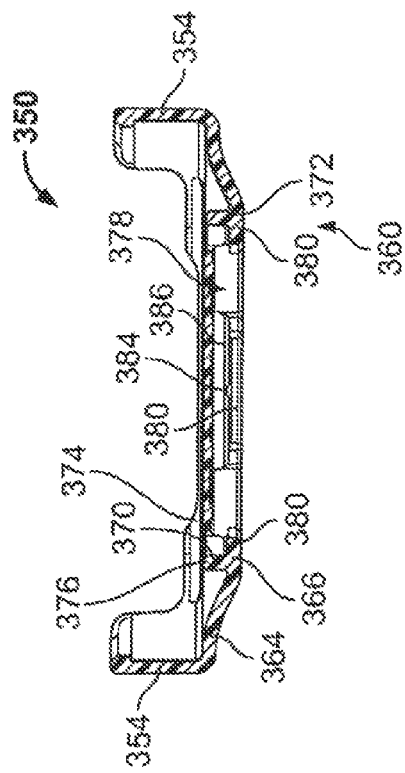
FIG. 24 is a cross-sectional view taken generally along the lines 24-24 of FIG. 22.
Figure 23:
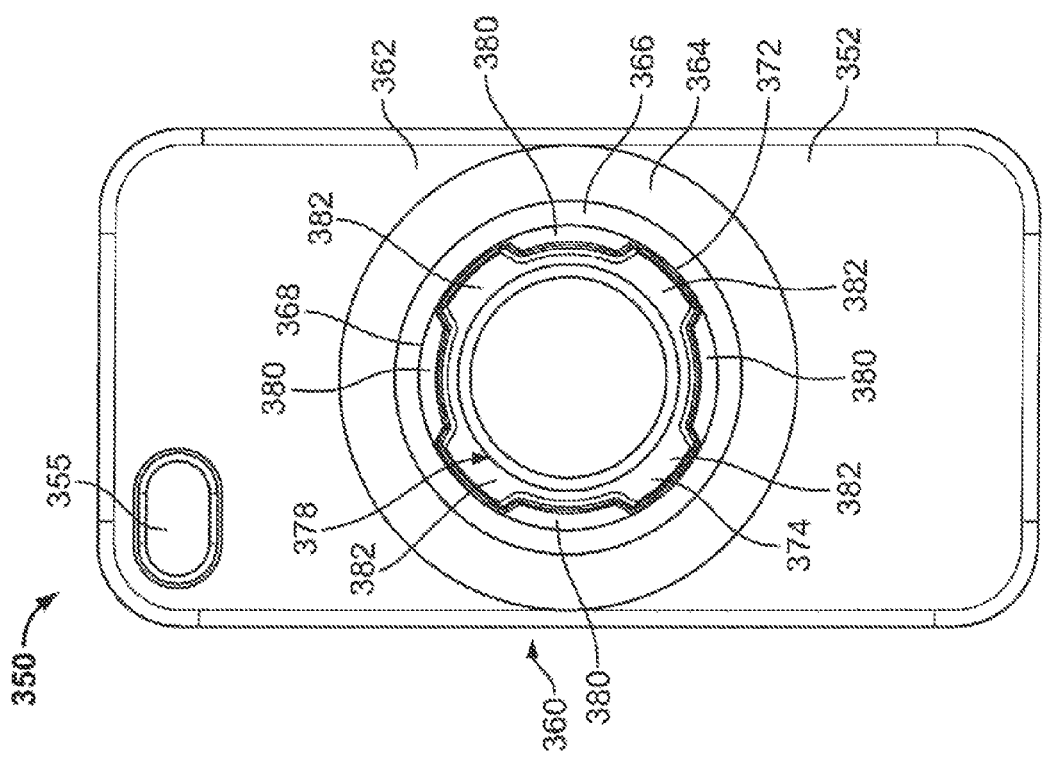
FIG. 23 is a top plan view of the case of FIG. 21.
Figure 25:
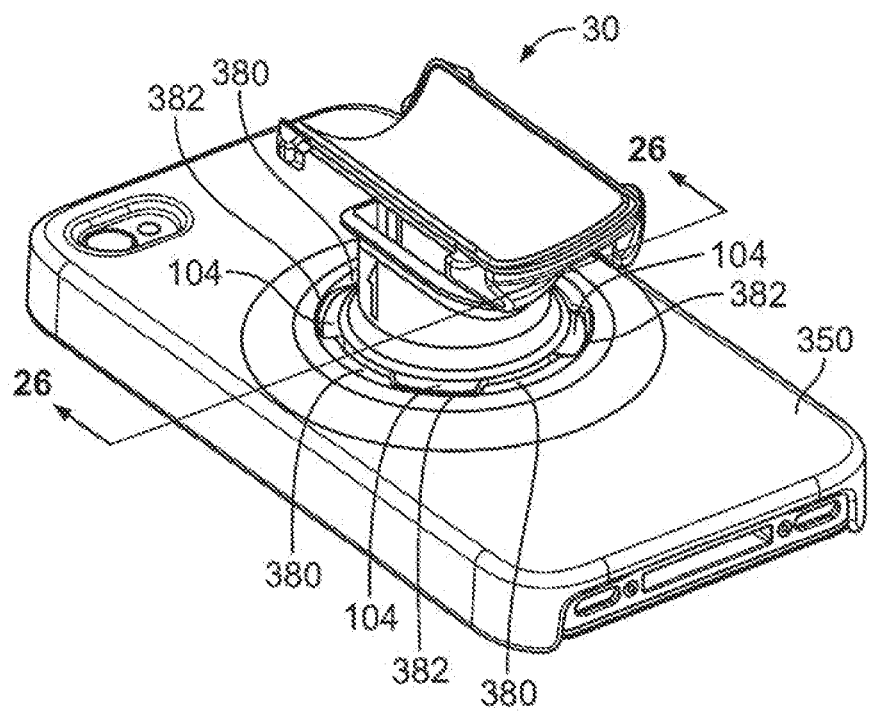
FIG. 25 is an isometric view of the apparatus of FIG. 1 attached to the case of FIG. 21.
Figure 26:
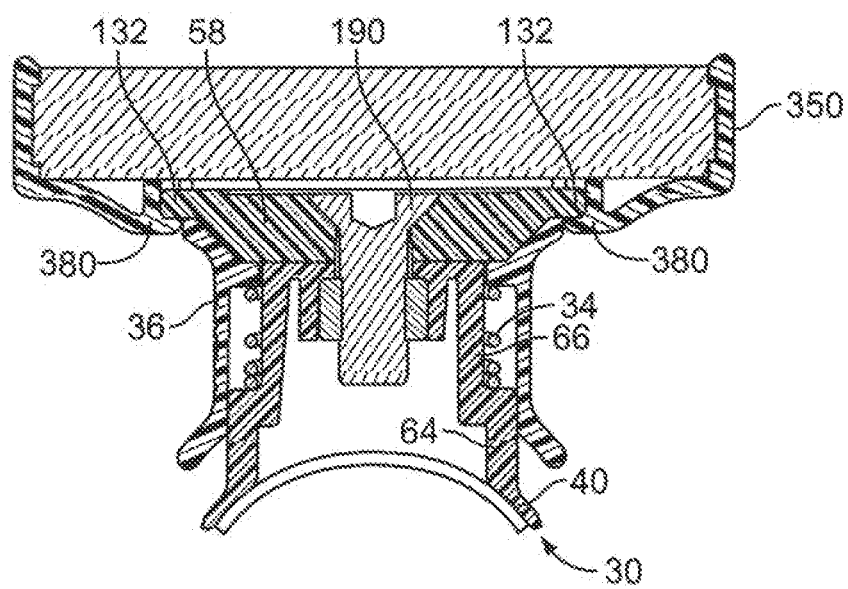
FIG. 26 is a cross-sectional view taken generally along the lines 26-26 of FIG. 25.

A circular mounting structure 360 is disposed within a central section 362 of the first wall 352. The mounting structure 360 includes a first annular ring 364 that tapers outwardly away from the first wall 352 and a second annular ring 366 generally parallel to the first wall 352 and disposed between the first annular ring 364 and a mount 368. As best seen in FIG. 24, the mount 368 includes a cylindrical wall 370 extending perpendicular to and inwardly from an inner edge 372 of the second annular ring 366. A circular wall 374 encloses an end 376 of the cylindrical wall 370 to create a cavity 378. Four spaced arcuate projections 380 extend inwardly from the Inner edge 372 of the second annular ring 366, forming grooves 382 between the arcuate projections 380. As seen in FIGS. 21 and 22, openings 383 are disposed within the circular wall 374 opposite the arcuate projections 380. Radial grooves 384 are formed on inner surfaces 386 of the arcuate projections 380 (see FIG. 24).

Figure 4:
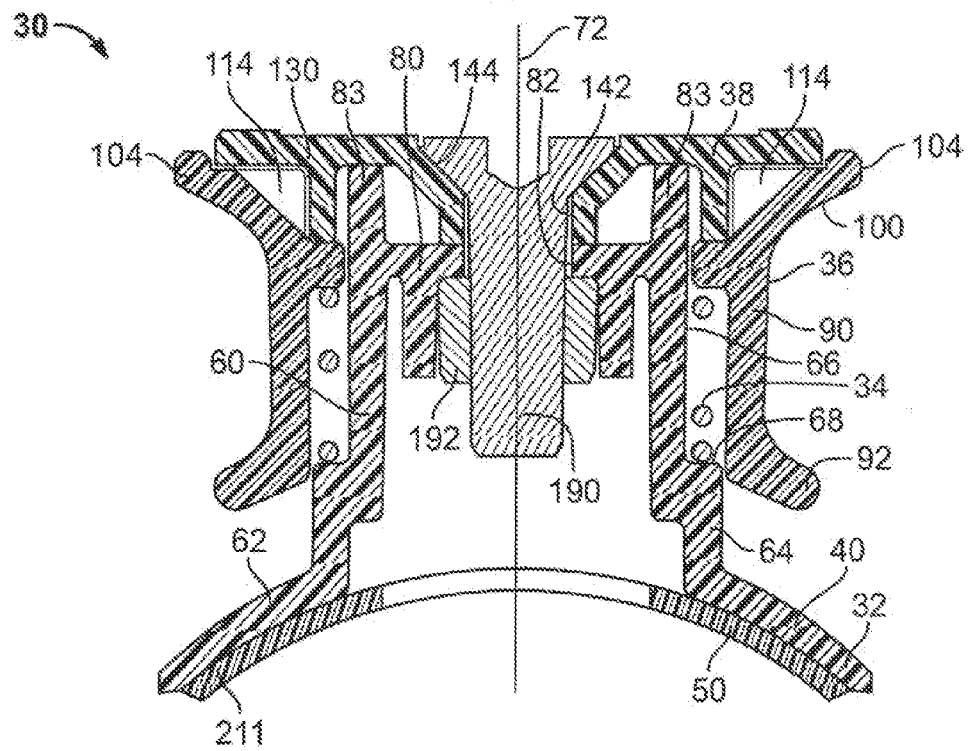
FIG. 4 is a cross-sectional view taken generally along the lines 4-4 of FIG. 1 and showing a spring-loaded looking collar in an extended or locked position.
Figure 5:
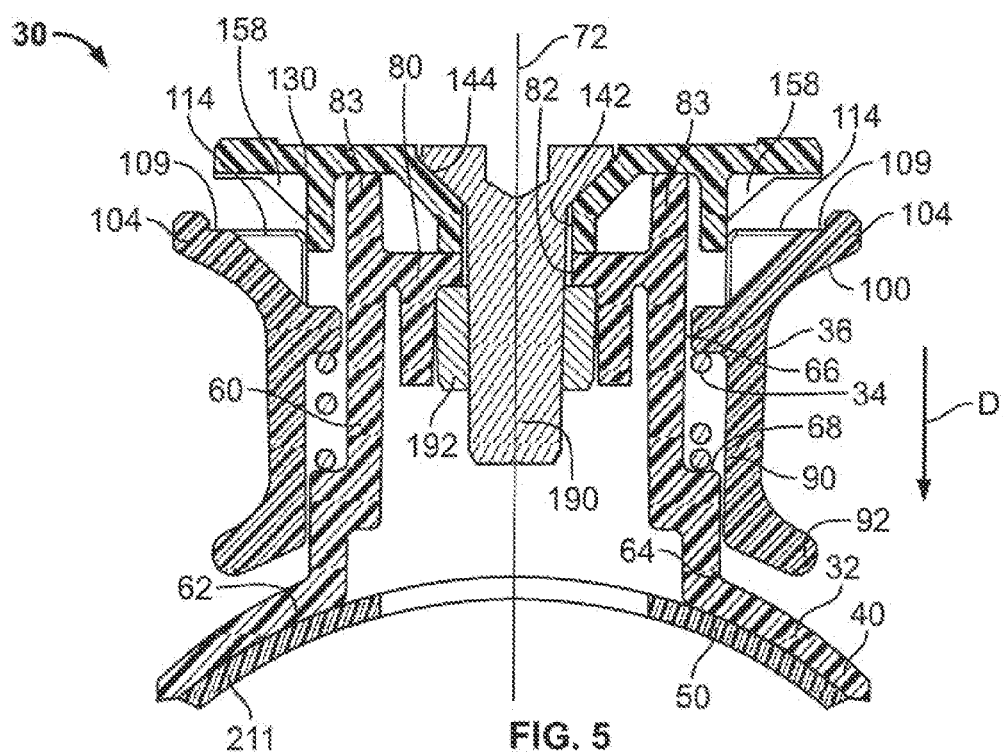
FIG. 5 is a cross-sectional view similar to the view of FIG. 4 and depicting the spring-loaded locking collar in a compressed or unlocked position.
Figure 6:
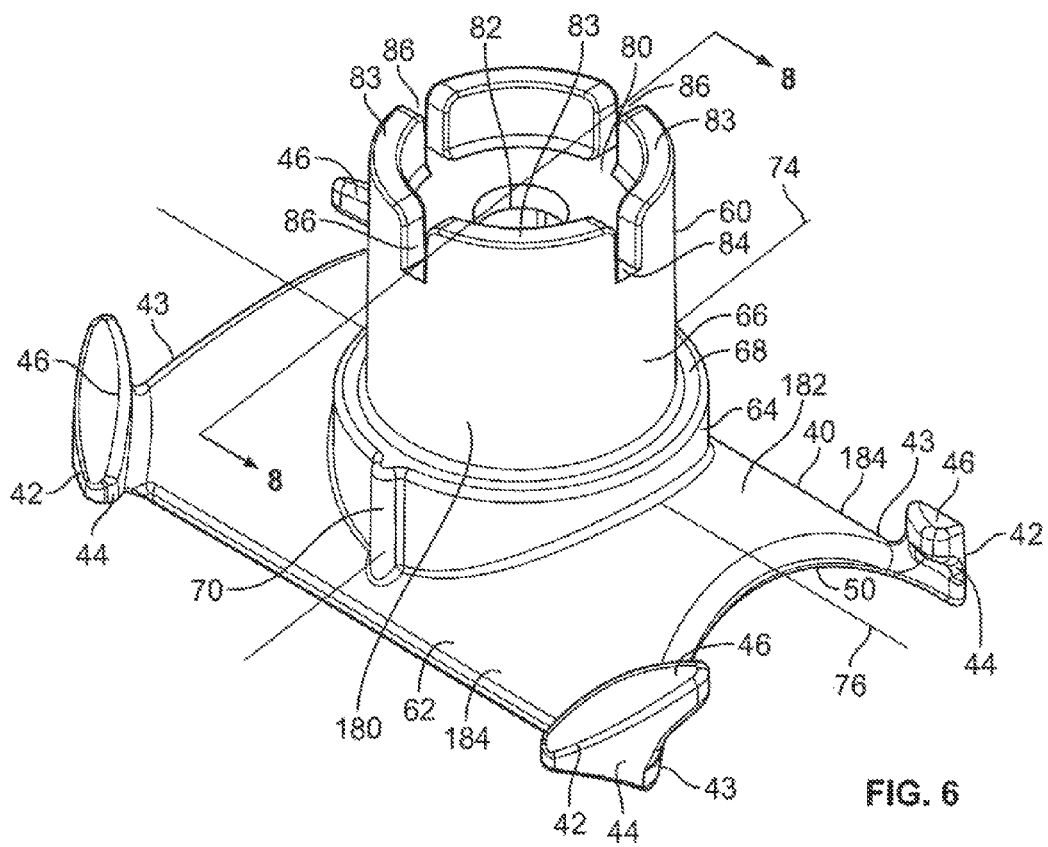
FIG. 6 is a top isometric view of the mounting mechanism generally depicted in FIG. 1.
Figure 7:
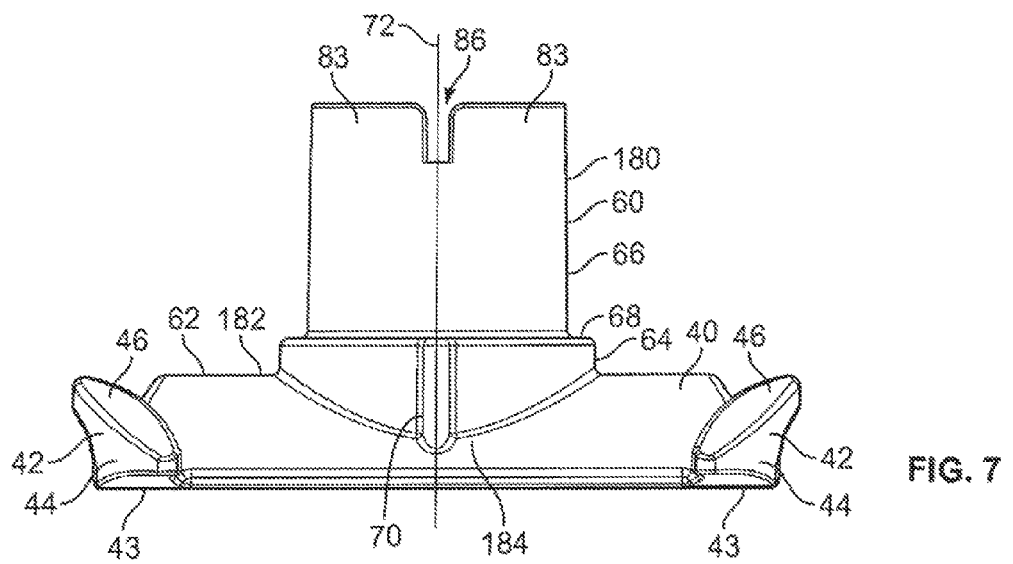
FIG. 7 is a side elevational view of the mounting mechanism of FIG. 6.
Figure 8:
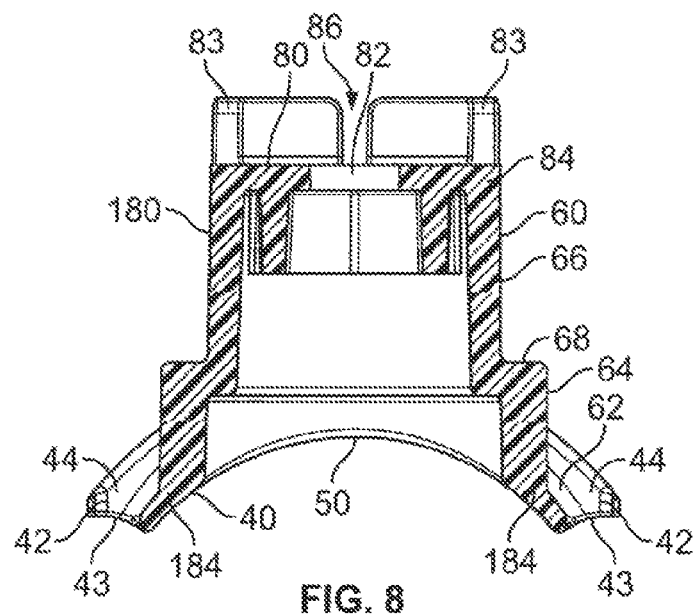
FIG. 8 is a cross-sectional view taken generally along the lines 8-8 of FIG. 6.
Figure 9:
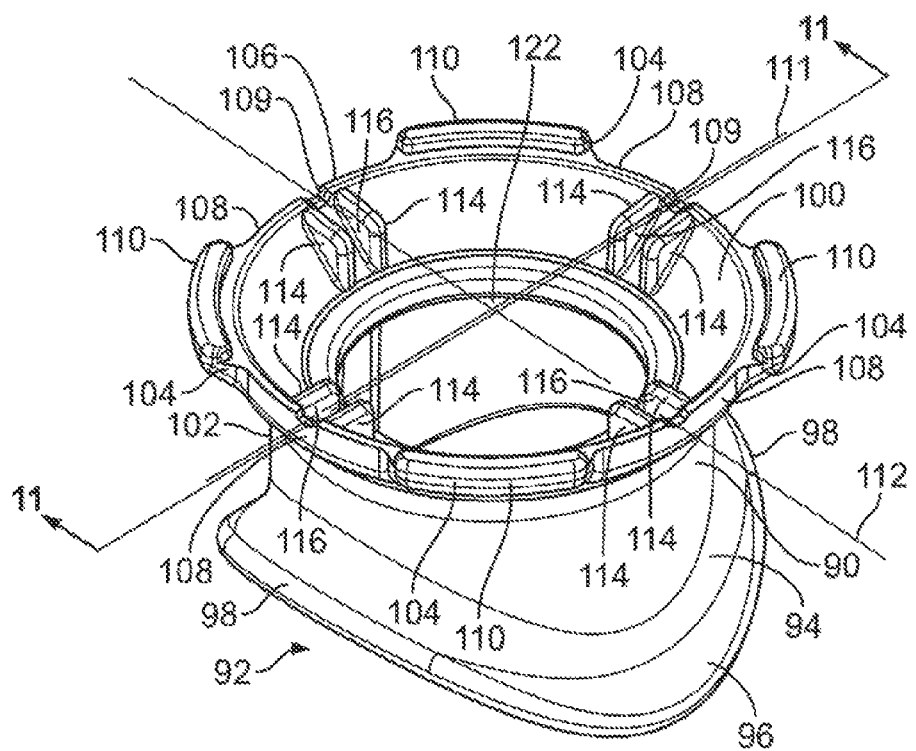
FIG. 9 is a top isometric view of the locking collar generally depicted in FIG. 1.
Figure 10:
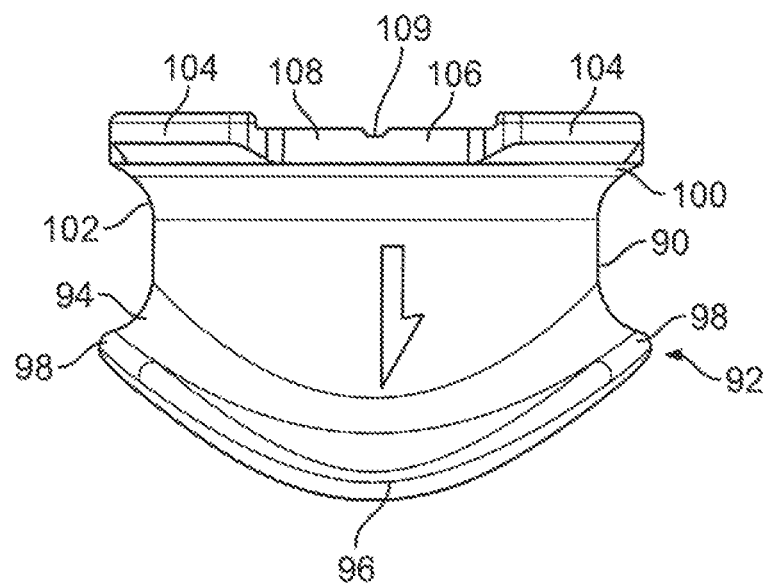
FIG. 10 is a side elevational view of the locking collar of FIG. 9.

Referring to FIGS. 25-28, the cover 350 of FIGS. 21-24 may be attached to the tube mount locking system 30 of FIGS. 1-16 and the lock mount 250 of FIGS. 17-20. In particular, referring to FIGS. 25 and 26, the cover 350 may be attached to the tube mount locking system 30, either before or after attachment of the tube mount locking system 30 to a surface or structure. The cover 350 is mounted to the tube mount locking system 30 by aligning the grooves 382 and arcuate projections 380 of the cover 350 with the arcuate projections 132 and the grooves 135, respectively, of the cap 38 of the tube mount locking system 30. In this position, the spring 34 is outwardly biased such that the collar 36 is biased against the cap 38, as seen in FIG. 4. With this alignment, pressure is exerted upon the tube mount locking system 30 in a direction D toward the mounting plate 40. This pressure causes the arcuate projections 380 of the cover 350 to interfere with and prevent movement of the annular projections 104, thereby pushing the spring-loaded collar 36 toward the mounting plate 40 against the bias of the spring 34. This movement allows the arcuate projections 132 of the cap 38 to enter the grooves 382 of the cover 350, wherein a user can then rotate the entire tube mount locking system 30 (or cover 350) forty-five degrees until the arcuate projections 132 of the locking collar 36 are aligned with the arcuate projections 380 of the cover 350 and the annular projections 104 snap into the grooves 382 of the cover 350 against the bias of the spring 34, preventing rotation of the tub mount locking system 30 or the cover 350. In this position, the radial elgonate projections 170 of the cap 38 are disposed within the radial grooves 384 of the cover 350 to further aid in preventing rotation of the cover 350 or tube mount locking system 30 without pulling the locking collar 36 toward the mounting plate 40 against the bias of the spring 34. Similarly, in order to remove the cover 350 front the tube mount locking system 30, the locking collar 36 must be pulled toward the mounting plate 40 against the bias of the spring 34 while rotating the tube mount locking system 30 until the arcuate projections 132 of the cap 38 are aligned within the grooves 282 of the cover 350.

Figure 27:
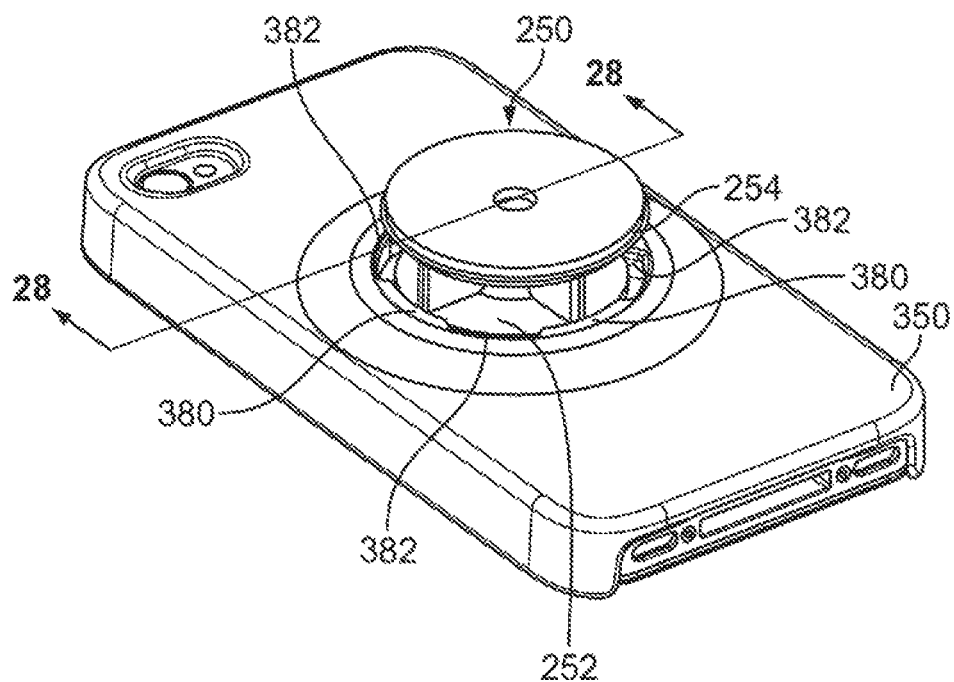
FIG. 27 is an isometric view of the apparatus of FIG. 17 attached to the case of FIG. 21.
Figure 28:
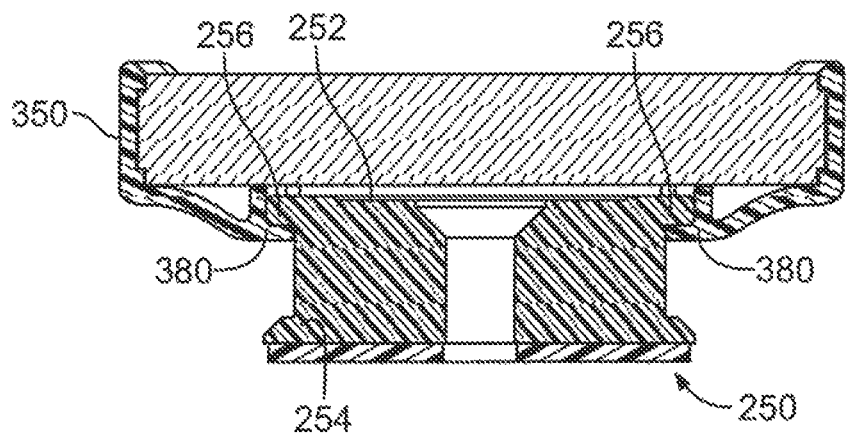
FIG. 28 is a cross-sectional view taken generally along the lines 28-28 of FIG. 27.

The lock mount 250 is attached to the cover 350, as seen in FIGS. 27 and 28 by aligning the grooves 382 and arcuate projections 380 of the cover 350 with the arcuate projections 256 and the grooves 259, respectively, of the lock mount 250. The cover 350 (or the lock mount 250) is thereafter rotate about 45 degrees until the arcuate projections 380 of the cover 350 and the arcuate projections 256 of the lock mount 250 are aligned and the radial elgonate projections 262 of the arcuate projections 256 snap into the radial grooves 384 of the arcuate projections 380. The cover 350 must be pushed toward the lock mount 250 and rotated in order to remove the cover 350 from the lock mount 250.

Although four sets of projections and grooves 132, 135 are depicted on the cap 38, four sets of projections and grooves 256, 259 are depicted on the lock mount 250, and four sets of projections and grooves 380, 382 are depicted on the cover 350, two or more sets of projections and grooves may be utilized on any of the cap 38, the lock mount 250, and the cover 350, so long as the number of grooves in the cover 350 is at least equal to the number of projections on the cap 38 and the lock mount 250.

Any of the embodiments described herein may be modified to include any of the structures or methodologies disclosed in connection with other embodiments.

Further, while directional terminology, such as front, back, upper, lower, top, bottom, etc. may be used throughout the present specification, it should be understood that such terms are not limiting and are only utilized herein to convey the orientation of different elements with respect to one another.

Numerous modifications to the present invention will be apparent to those skilled in the art in view of the foregoing description. Accordingly, this description is to be construed as illustrative only and is presented for the purpose of enabling those skilled in the art to make and use the invention and to teach the best mode of carrying out same. The exclusive rights to all modifications which come within the scope of the appended claims are reserved.

We claim:

1. A system for mounting an electronic handheld device, the system including:
   an apparatus adapted for attachment to an electronic handheld device and a mounting structure within a wall of the apparatus, wherein the mounting structure includes a cavity formed at a first end by an end wall and at a second end by at least two arcuate projections with at least two arcuate grooves formed between the at least two arcuate projections; and
   a locking structure having a generally circular wall with at least two arcuate projections extending outwardly from an edge of the circular wall, wherein at least two arcuate grooves are formed between the at least two arcuate projections;
   a biased structure having a tab extending therefrom, the biased structure being biased toward the locking structure;
   wherein the locking structure is attached to the apparatus by moving the biased structure away from the locking structure, aligning the at least two arcuate projections of the locking structure with the at least two arcuate grooves of the mounting structure, inserting the locking structure into the cavity, rotating the locking structure or the apparatus until the at least two arcuate projections of the mounting structure are at least partially aligned with the at least two arcuate projections of the locking structure, respectively, thereby attaching the apparatus and the locking structure, and releasing the biased structure to allow the tab on the biased structure to enter one of the at least two grooves in the apparatus to prevent rotation or removal of the locking structure from the apparatus.

2. The system of claim 1, wherein the locking structure includes a mounting plate, a mounting structure extending outwardly from the mounting plate, a locking collar spring-loadingly attached to the cylindrical mounting structure, and a cap attached to the mounting structure and cooperating with the locking collar.

3. The system of claim 2, wherein the mounting plate includes a plurality of retaining mechanisms comprising an outwardly extending wall and a projection extending generally perpendicular to the outwardly extending wall.

4. The system of claim 1, wherein the apparatus is a case for encasing an electronic handheld device.

5. The system of claim 2, wherein the mounting structure includes a first cylindrical wall disposed adjacent the mounting plate and a second cylindrical wall extending from the first cylindrical wall and further wherein the first cylindrical wall has a diameter that is greater than a diameter of the second cylindrical wall to create a planar ledge between the first and second cylindrical walls.

6. The system of claim 5, wherein a spring is disposed adjacent an outer surface of the second cylindrical wall with a first end of the spring in contact with the planar ledge and further wherein the locking collar is disposed around the second cylindrical wall and includes an inwardly extending annular ledge in contact with a second end of the spring, such that movement of the locking collar toward the mounting plate compresses the spring between the annular ledge and the planar ledge.

7. The system of claim 6, further including at least one elongate projection or groove extending along an outer surface of the first wall and at least one of the other of an elongate projection or groove extending along an inner surface of the locking collar, such that the elongate projection or groove of the first wall and the elongate projection or groove of the locking collar cooperate to guide the locking collar during movement of the locking collar.

8. The system of claim 6, wherein the locking collar includes a frustroconical wall extending outwardly at the inwardly extending annular ledge, wherein the frustroconical wall includes at least two annular grooves and at least two annular projections at an end thereof.

9. The system of claim 8, wherein the locking structure is in the form of a cap that is attached to the mounting structure such that the at least two arcuate projections of the locking structure are disposed within the at least two annular grooves of the locking structure when the spring is not compressed.

10. The system of claim 9, wherein when the at least two arcuate projections of the mounting structure of the apparatus are at least partially aligned with the at least two projections of the locking structure, respectively, the two annular projections of the locking collar are disposed within the at least two grooves of the mounting structure of the apparatus to attach the locking structure to the apparatus and prevent removal of the locking structure from the apparatus.

11. The system of claim 9, wherein the mounting structure further includes an end wall extending between and at least partially enclosing an end of the second cylindrical wall, the end wall having a first aperture therethrough, a second aperture extends through a center of the cap, and a fastener is inserted through the second aperture of the cap and the first aperture in the end wall with a head of the fastener retaining the fastener adjacent the cap and a nut retaining the fastener adjacent the end wall to attach the cap to the cylindrical mounting structure with the locking collar between the cap and the cylindrical mounting structure.

12. The system of claim 9, wherein the cap includes at least one cylindrical support wall extending from a first surface thereof and at least two triangular radial walls extending from the cylindrical support wall and aligned with the at least two arcuate projections of the mounting structure.

13. The system of claim 12, wherein the frustroconical wall of the locking collar includes at least two sets of triangular projections and wherein, when the cap is attached to the mounting structure, the triangular radial walls of the cap are disposed within grooves formed by the sets of triangular projections.

14. The system of claim 13, wherein radial elongate projections extend outwardly from rear surfaces of the at least two arcuate projections of the circular wall.

15. The system of claim 14, wherein when the at least two arcuate projections of the mounting structure are at least partially aligned with the at least two projections of the locking structure, respectively, the radial elongate projections of the arcuate projections of the circular wall are disposed within grooves on inner surfaces of the at least two arcuate projections of the mounting structure of the apparatus.

16. A system for mounting an electronic handheld device, the system including:
   a mount adapted to be attached to a structure, the mount including a mount wall having a first surface with a guide extending therefrom and a second opposing surface adapted to be attached to a structure;
   an apparatus adapted for attachment to an electronic handheld device and a mounting structure within a wall of the apparatus, wherein the mounting structure includes a cavity formed at a first end by an end wall and at a second end by at least two arcuate projections with at least two grooves formed between the at least two projections;
   a cap attached to an end of the guide opposite the first surface, the cap including a generally circular wall and at least two arcuate projections extending outwardly from an edge of the circular wall, wherein at least two grooves are formed between the at least two projections; and
   a biased structure spring-loadingly mounted adjacent the guide and including a locking tab, wherein the biased structure is biased against the cap in an unactuated position and wherein the biased structure is moved to an actuated position by moving the biased structure toward the mount wall, wherein in the actuated position, the at least two arcuate projections of the cap are aligned with the at least two grooves of the mounting structure and, in the unactuated position, the locking tab on the biased structure is simultaneously positioned within one of the at least two groove in the cap and one of the at least two grooves in the apparatus to prevent rotation or removal of the cap from the apparatus.

17. A system for mounting an electronic handheld device, the system comprising:
   an apparatus adapted for attachment to an electronic handheld device and a mounting structure within a wall of the apparatus, wherein the mounting structure includes a cavity formed at a first end by an end wall and at a second end by at least one arcuate projection with at least one arcuate groove formed adjacent the at least one arcuate projection;

a biased structure comprising:
  a body;
  a mount disposed at a first end of the body and adapted to be attached to a structure;
  a cap disposed at a second end of the body opposite the mount and comprising a generally circular wall with at least one arcuate projection extending outwardly from an edge of the circular wall and at least one arcuate groove formed adjacent the at least one arcuate projection, wherein the arcuate projection and arcuate groove of the apparatus are adapted to interact with the arcuate projection and arcuate groove of the cap to attach the cap to the apparatus; and
  a biased projection disposed between the mount and the cap and biased toward the cap, wherein in an actuated position, the biased projection is moved away from the cap such that the at least one arcuate projection of the cap are inserted into the at least one arcuate groove of the apparatus and, in an unactuated position, the biased projection is released into a recess in the apparatus to attach the biased structure to the apparatus.

18. The system of claim 17, wherein the projection is biased toward the cap by a spring.

19. A system for mounting an electronic handheld device, the system including:
  an apparatus adapted for attachment to an electronic handheld device and a mounting structure within a wall of the apparatus, wherein the mounting structure includes a cavity formed at a first end by an end wall and at a second end by at least two arcuate projections with at least two grooves formed between the at least two projections; and
  a locking structure having a cylindrical structure, generally circular top wall with at least two arcuate projections extending outwardly from an edge of the top wall, wherein at least two grooves are formed between the at least two projections and wherein at least one of the arcuate projections includes a first surface facing away from the cylindrical structure, a second surface facing the cylindrical structure, and a radial elongate projection extending along the second surface;
  a locking projection operatively connected to the locking structure;
  wherein the locking structure is attached to the apparatus by aligning the at least two arcuate projections of the locking structure with the at least two grooves of the mounting structure, inserting the locking structure into the cavity, and rotating the locking structure or the apparatus until the at least two arcuate projections of the mounting structure are at least partially aligned with the at least two projections of the locking structure, respectively, thereby attaching the apparatus and the locking structure, and allowing the locking projection to enter one of the at least two grooves in the apparatus to prevent rotation or removal of the locking structure from the apparatus.

20. A system for mounting an electronic handheld device, the system including:
  an apparatus adapted for attachment to an electronic handheld device and a mounting structure within a wall of the apparatus, wherein the mounting structure includes a cavity formed at a first end by an end wall and at a second end by four arcuate projections spaced ninety degrees from adjacent arcuate projections and having grooves formed between each of the arcuate projections; and
  a locking structure having a generally circular wall with four arcuate projections extending outwardly from an edge of the circular wall and spaced ninety degrees from adjacent arcuate projections, wherein grooves are formed between each of the arcuate projections, and wherein the locking structure is in the form of a cap that is connected to the mounting structure such that the arcuate projections of the locking structure are disposed within the annular grooves of the locking structure when the spring is not compressed;
  wherein the locking structure is attached to the apparatus by moving a biased structure biased toward the locking structure away from the locking structure, aligning the arcuate projections of the locking structure with the grooves of the mounting structure, inserting the locking structure into the cavity, and rotating the locking structure or the apparatus until the arcuate projections of the mounting structure are at least partially aligned with the arcuate projections of the locking structure, respectively, thereby attaching the apparatus and the locking structure.

* * * * *